US011800948B2

United States Patent
Carnevali et al.

(10) Patent No.: US 11,800,948 B2
(45) Date of Patent: Oct. 31, 2023

(54) HOUSEHOLD APPLIANCE COMPRISING A LIQUID TANK

(71) Applicant: ELECTROLUX APPLIANCES AKTIEBOLAG, Stockholm (SE)

(72) Inventors: Marco Carnevali, Forli (IT); Nicola Guida, Forli (IT); Paolo Faraldi, Forli (IT); Alberto Dell'Olio, Forli (IT)

(73) Assignee: Electrolux Appliances Aktiebolag, Stockholm (SE)

( * ) Notice: Subject to any disclaimer, the term of this patent is extended or adjusted under 35 U.S.C. 154(b) by 482 days.

(21) Appl. No.: 16/652,430

(22) PCT Filed: Nov. 6, 2018

(86) PCT No.: PCT/EP2018/080352
§ 371 (c)(1),
(2) Date: Mar. 31, 2020

(87) PCT Pub. No.: WO2019/096632
PCT Pub. Date: May 23, 2019

(65) Prior Publication Data
US 2020/0281355 A1 Sep. 10, 2020

(30) Foreign Application Priority Data

Nov. 17, 2017 (EP) ..................................... 17202380

(51) Int. Cl.
*A47B 88/457* (2017.01)
*A47J 27/04* (2006.01)
*F24C 15/32* (2006.01)

(52) U.S. Cl.
CPC ............. *A47J 27/04* (2013.01); *F24C 15/327* (2013.01); *A47B 2210/17* (2013.01)

(58) Field of Classification Search
None
See application file for complete search history.

(56) References Cited

U.S. PATENT DOCUMENTS

2009/0261697 A1* 10/2009 Hill et al. .............. A47B 88/00
312/333
2009/0322195 A1 12/2009 Joerger et al.

FOREIGN PATENT DOCUMENTS

CN      105395042 A1 * 3/2016 ............. A47J 37/06
CN      105518208 A1 * 4/2016 ............. D06F 58/22
(Continued)

OTHER PUBLICATIONS

Machine translation of WO 2016055906 A1 performed on Aug. 11, 2022, Seibert et al. (Year: 2016).*
(Continued)

*Primary Examiner* — Brian W Jennison
*Assistant Examiner* — Kevin Guanhua Wen
(74) *Attorney, Agent, or Firm* — Pearne & Gordon LLP

(57) ABSTRACT

A household appliance (10) is disclosed which comprises a liquid tank (12), wherein the tank is adapted for translational movement between a use position in which the tank is positioned within a housing (15) of the household appliance and a servicing position in which the tank is at least partially extracted from the housing, the household appliance further comprises biasing means (30) for biasing the tank towards the servicing position, and releasable latch means (36; 38; 58) for selectively arresting the tank in the use position or releasing the tank for movement towards the servicing position. In accordance with the invention: the household appliance (10) further comprises a carriage (24) associated to the tank (12) and configured for translational movement along guide means (28) provided in the housing (15); the biasing means (30) comprises a spring element configured to be loaded when the tank (12) is moved from the servicing position towards the use position; and the latch means comprises:20—a catch (36) provided at the carriage, —a locking member (38; 58) located at the housing (15) which in the use position of the tank (12) engages the catch (36) to (Continued)

arrest the tank in the use position, and —release means (40; 62) for disengaging the locking member25 from the catch (36).

17 Claims, 5 Drawing Sheets

(56) References Cited

FOREIGN PATENT DOCUMENTS

| | | | | |
|---|---|---|---|---|
| CN | 106979645 A1 * | 7/2017 | ........... | F25D 25/025 |
| EP | 2550902 A1 * | 1/2013 | .............. | A47J 27/04 |
| EP | 2550902 B1 | 1/2013 | | |
| EP | 2522915 B1 | 2/2015 | | |
| ES | 2463590 A2 * | 6/2012 | ........... | F24C 15/327 |
| ES | 2380374 T5 * | 4/2017 | ........... | D06F 58/203 |
| FR | 2814734 A1 * | 4/2002 | ........... | F24C 15/327 |
| JP | 2017059418 A1 * | 3/2017 | ............ | H01H 36/00 |
| WO | WO 2009115277 A2 * | 9/2009 | | |
| WO | 2014206481 A1 | 12/2014 | | |
| WO | WO 2016055906 A1 * | 4/2016 | ............. | B21D 37/14 |
| WO | 2016145717 A1 | 9/2016 | | |

OTHER PUBLICATIONS

Machine translation of CN 106979645 A1 performed on Aug. 12, 2022, Wang et al. (Year: 2017).*
Machine translation of CN 105395042 A1 performed on Aug. 12, 2022, Luo et al. (Year: 2016).*
Machine translation of CN 105518208 A1 performed on Aug. 15, 2022, Bison et al. (Year: 2016).*
Machine translation of JP 2017059418 A1 performed on Aug. 15, 2022, Yabuuchi et al. (Year: 2017).*
Machine translation of EP 2463590 A2 performed on Mar. 23, 2023, Bleier et al. (Year: 2012).*
Machine translation of FR 2814734 A1 performed on Mar. 23, 2023, Papet et al. (Year: 2002).*
Machine translation of ES 2380374 T5 performed on Mar. 23, 2023, Pont et al. (Year: 2017).*
International Search Report and Written Opinion issued in PCT/EP2018/080352 dated Jan. 4, 2019, 10 pages.

* cited by examiner

HOUSEHOLD APPLIANCE COMPRISING A LIQUID TANK

The present invention relates to a household appliance comprising a liquid tank, wherein the tank is adapted for translational movement between a use position in which the tank is positioned within a housing of the household appliance and a servicing position in which the tank is at least partially extracted from the housing, the household appliance further comprising biasing means for biasing the tank towards the servicing position, and releasable latch means for selectively arresting the tank in the use position or releasing the tank for movement towards the servicing position.

The present invention is of particular advantage for household appliances that are equipped with liquid tanks that require frequent servicing, such as condensation dryers that collect water in a water tank, or food preparation ovens that provide a steaming function by which water or steam is fed into the cooking cavity during a cooking process. Whereas in a condensation dryer the tank is to be emptied preferably after each drying cycle, but at the latest when the tank is filled, in an oven having a steam generator, such as a boiler arrangement that is located outside the cooking cavity, or a pan that is located inside the cooking cavity in which water is heated and thus evaporated, the tank which feeds the steam generator always should be freshly filled when starting a cooking cycle, and further remaining water should be emptied from the tank after conclusion of a cooking cycle.

While in such household appliances the tank needs to be serviced frequently, so as to be filled, emptied or cleaned, the tank should be easily accessible, which however is difficult to implement given the design constraints in modern household appliances. Thus there are household appliances on the market, in which the tank is hidden behind the front panel, which solution necessitates that the front panel needs to be removed or displaced so as to allow access to the tank, which not only requires a complicated and thus costly mechanics, but which also is disadvantageous in terms of handling.

In order to overcome these disadvantages, it was suggested in EP 2 522 915 A1 to provide for a household appliance in which the tank is located such that in the use position of the tank a front panel thereof is arranged flush with the front panel of the household appliance, which thus allows providing for a tank that is directly accessible, but nevertheless can be integrated into the front panel. Since in such a flush design the provision of handles or the like for manipulating the tank are to be avoided, in the household appliance suggested in EP 2 522 915 A1 the tank is provided with a retractable pulling element which carries a front panel that in the use position of the tank is located flush with the front panel of the household appliance, but which, similarly as a retractable ballpoint pen, can be brought into a position in which the front panel of the pulling element is located offset to the front panel of the household appliance and thus allows gripping of the tank, so that the tank can be pulled out for a distance to expose a filling opening of the tank.

Also in EP 2 550 902 A1 there is disclosed a household appliance in which the tank is located such that in the use position of the tank a front panel of the tank is arranged flush with the front panel of the household appliance. In order to move the tank into an extracted position so as to expose a filling opening, the user has to push onto a front section of the tank which is exposed within the front panel of the household appliance. By pushing the tank for a certain distance inwards, a mechanism is released which holds the tank inside the household appliance, so that the tank can be exerted by a spring mechanism.

Common to the household appliances disclosed in EP 2 522 915 A1 and EP 2 550 902 A1 is that both require complicate mechanics for displacing the tank into a servicing position in which fresh water can be filled into the tank.

It is an object of the present invention to provide for a household appliance with a liquid tank, in which the tank is adapted for translational movement between a use position in which the tank is positioned within a housing of the household appliance and a servicing position in which the tank is at least partially extracted from the housing, wherein complicate mechanics as they are required in the above prior art documents are not required to provide for a translational movement of the tank from a use position to a servicing position.

In a household appliance comprising a liquid tank, wherein the tank is adapted for translational movement between a use position in which the tank is positioned within a housing of the household appliance and a servicing position in which the tank is at least partially extracted from the housing, the household appliance further comprising biasing means for biasing the tank towards the servicing position, and releasable latch means for selectively arresting the tank in the use position or releasing the tank for movement towards the servicing position, the above object is solved in that the household appliance further comprises a carriage associated to the tank and configured for translational movement along guide means provided in the housing, wherein the biasing means comprises a spring element configured to be loaded when the tank is moved from the servicing position towards the use position, and wherein the latch means comprises a catch provided at the carriage, a locking member located at the housing which in the use position of the tank engages the catch to arrest the tank in the use position, and release means for disengaging the locking member from the catch.

The household appliance of the present invention, which particularly may be a cooking oven, a steamer or a condensation dryer, comprises a carriage which provides for translational movement of the tank, such as a linear movement in a direction generally perpendicular to the front of the household appliance. The carriage is configured to load a spring when the tank is moved from the servicing position towards the use position in which the carriage and hence the tank is locked, wherein the spring acts as biasing means for the carriage, i.e. acts as an expulsion means for the tank which pushes the carriage and hence the tank outwards towards the servicing position when the lock is released by activating a release means for disengaging the locking member from the catch.

The present invention thus provides a household appliance in which the tank can be designed flush with the front panel of the household appliance and without means for manipulating the tank, such as a handle or a gripping orifice, so that the tank can be easily integrated into the design of the front panel, wherein there is provided in a simple and thus cost effective manner for means for ejecting the tank on request of the user.

The locking member may comprise a retractable piston or a rotatable hook which in the use position of the tank engages a catch provided at the carriage. Preferably, the locking member is biased towards engagement with the catch, so that the locking member snaps into engagement with the catch upon the tank reaching its use position.

In preferred embodiments, the catch comprises a ramp surface configured to displace the locking member when the tank is moved towards the use position and to release the locking member to engage the catch upon the tank reaching the use position. In such embodiments, the combination of catch and locking member provides for mutual locking, and releasing, respectively, wherein when shifting the tank inwardly into its use position, the locking member moves along the ramp surface of the catch, during which ramping movement the locking member is increasingly biased, wherein upon reaching the end of the ramp surface the locking member snaps back and thus locks the catch, in which position the tank is held against a biasing force in its use position. When the user wishes to displace the tank into its servicing position, the release means is activated so as to disengage the locking member from the catch in which manner the tank is released against its biasing force and thus is ejected for a certain distance, such as to expose a fill opening of the tank.

Preferably the household appliance comprises an electric drive for retracting the locking member out of its engagement with the catch, which allows releasing the tank to move towards its servicing position by activating a respective switching element. Alternatively or additionally, the electric drive also could be activated by the control of the household appliance, so as to automatically eject the tank in the course of an operating program, such as in a dryer at the end of a drying operation.

In order to provide for ejection of the tank on request of the user, the household appliance further may comprise an actuation element for activating the electric drive, wherein the actuation element is positioned at a front panel of the household appliance or at a front panel of the liquid tank. The actuation element can be a switch, such as a touch sensitive element, that can be positioned at the tank or in proximity thereto.

In order to allow filling the tank by only a partial ejection of the tank, the tank advantageously comprises a fill opening in the upper side of the tank at the front end of the tank. In such embodiments, the servicing position, or a first servicing position, can be a position in which the tank is extracted to an extent such that the fill opening is exposed. A further servicing position can be a position, in which the tank is fully extracted from the household appliance, such that the tank can be carried to a tap for filling, or to a sink for emptying the tank.

The carriage can be fixedly connected to the tank or can be formed integrally with the tank, so that the tank and the carriage form a unitary component.

In the alternative, the tank can be removably connected to the carriage, such as in embodiments which shall allow a full extraction of the tank from the household appliance, so as to allow taking the tank to a tap or to a sink.

Whereas in such latter embodiments the releasable connection between the tank and the carriage can be implemented in any feasible manner, such as by providing for recesses or hooks at the tank (or the carriage) for accommodating corresponding pins that are provided at the carriage (or the tank, respectively), wherein for releasing the tank from the carriage the tank is to be lifted to disengage the pins from the grooves or hooks, in preferred embodiments the sliding means for accommodating the tank are oriented generally parallel to the guide means. For example, when the guide means for the carriage is configured for providing for a linear movement of the carriage relative to the housing, wherein for example a ball bearing slide may be provided as the guide means, the sliding means for accommodating the tank advantageously may comprise straight guide rails for guiding sliders of the tank. While when displacing the tank to its use position, the tank is withdrawn from the household appliance like a drawer, the tank can be removed from the household appliance, such as to fill the tank at a tap, by simply continuing such opening movement, i.e. by pulling at the tank in the direction of the opening movement by which the tank is released from the carriage.

In preferred embodiments, the household appliance further comprises a fluid coupling that provides for connection of the tank to a fluid line of the household appliance, such as in embodiments in which the household appliance is a steam oven, a fluid line that connects to a steam generator, or in embodiments in which the household appliance is a condensation dryer, a fluid line that connects to a condenser.

In order to provide for a quick-connection of the tank during insertion into or removal from the household appliance, the household appliance can be provided with a fluid coupling that comprises a first member which is provided at the tank and a second member that is provided either at the carriage or at the housing and which is connected to a fluid line of the household appliance. That is, the fluid coupling can be designed to provide for a fluid connection to the tank when the tank is inserted into the carriage, in which case the second coupling member is provided at the carriage and is connected via a flexible hose to the fluid line of the household appliance. In the alternative, the second coupling member can be provided at the housing, i.e. is fixedly arranged in the housing of the household appliance, wherein the coupling to the tank is effected by setting the tank into the carriage and then moving the carriage and hence the tank towards the use position of the tank, in the course of which movement the fluid coupling is effected.

The household appliance further may comprise dampening means for slowing the movement of the carriage before the tank reaches the servicing position, so as to provide for a smooth stop of the tank when it reaches its servicing position.

Preferred embodiments of the present invention are described below by reference to the drawings in which.

Figure 1:
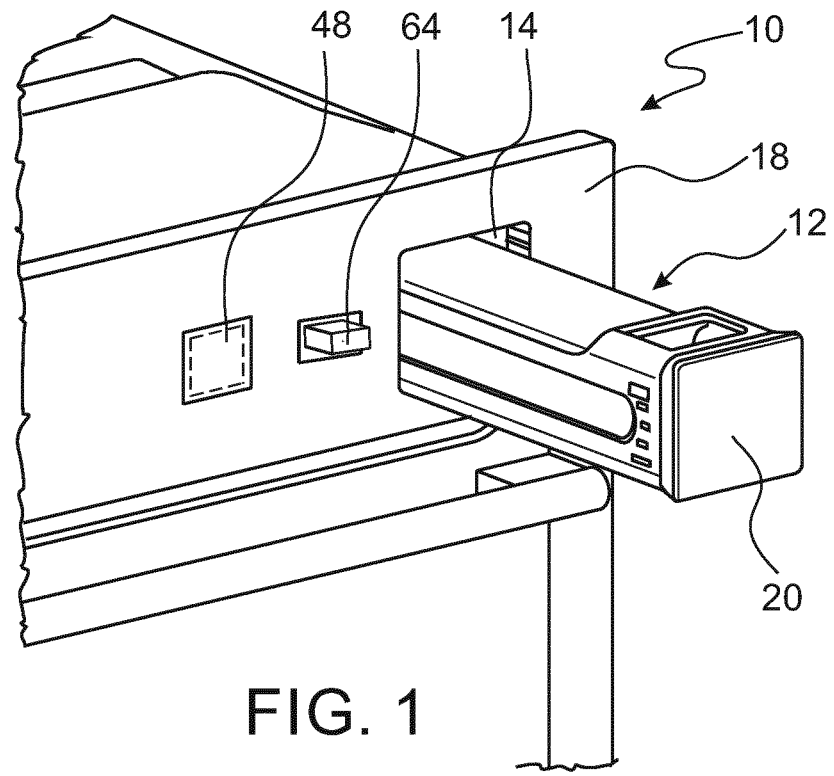
FIG. 1 is a perspective view of a household appliance in accordance with the present invention.

In the exemplary embodiment illustrated in FIG. 1, the household appliance is an electric cooking oven that provides for a steaming function. Oven 10 comprises a cooking chamber into which steam can be applied from the steam generator which is fed with water from a water tank 12. In the embodiment shown in FIG. 1, water tank 12 is a generally box shaped container which in its use position is arranged in an upper section of the oven above the cooking chamber. Water tank 12 can be a molded plastic component which is designed for insertion into a respective receptacle 14 by an aperture 16 which is provided in the front panel 18 of the oven. At its front face, tank 12 is provided with a cover element 20, the shape of which corresponds to the shape of aperture 16. While in the embodiment illustrated in FIG. 1 the water tank 12 has the shape of a generally rectangular block having at least for a portion of its length a square cross-section, which water tank has a volume of about 1 liter, the tank of course can have any other size or cross-sectional shape, such as a circular or rectangular cross-sectional shape. Furthermore, the cover element 20 may have a shape that is different from the cross-sectional shape of the tank 12, so as to adapt the design of cover element 20 to the design of front panel 18. Thus, the tank 12 for example may have a circular cross-sectional shape, but the cover element 20 may have a square shape.

Whereas in many cases it will be preferred that cover element 20 has a similar surface design as front panel 18, such as by producing cover element 20 and front panel 18 from the same material or by providing both these components with a same coating, cover element 20 also may have a design that differs from that of front panel 18 so as to provide for a signaling function of cover element 20.

Towards its front end tank 12 comprises a fill opening 22 via which water can be filled into the tank. While FIG. 1 shows tank 12 in an intermediate position as it will be attained during removal of the tank, it is to be understood that in order to enable filling of the tank, it is sufficient to eject the tank from the receptacle 14 only by a short distance which corresponds to the dimension of the fill opening 22 measured in the longitudinal direction of the tank, as will be explained in more detail by reference to FIG. 4.

Figure 2:
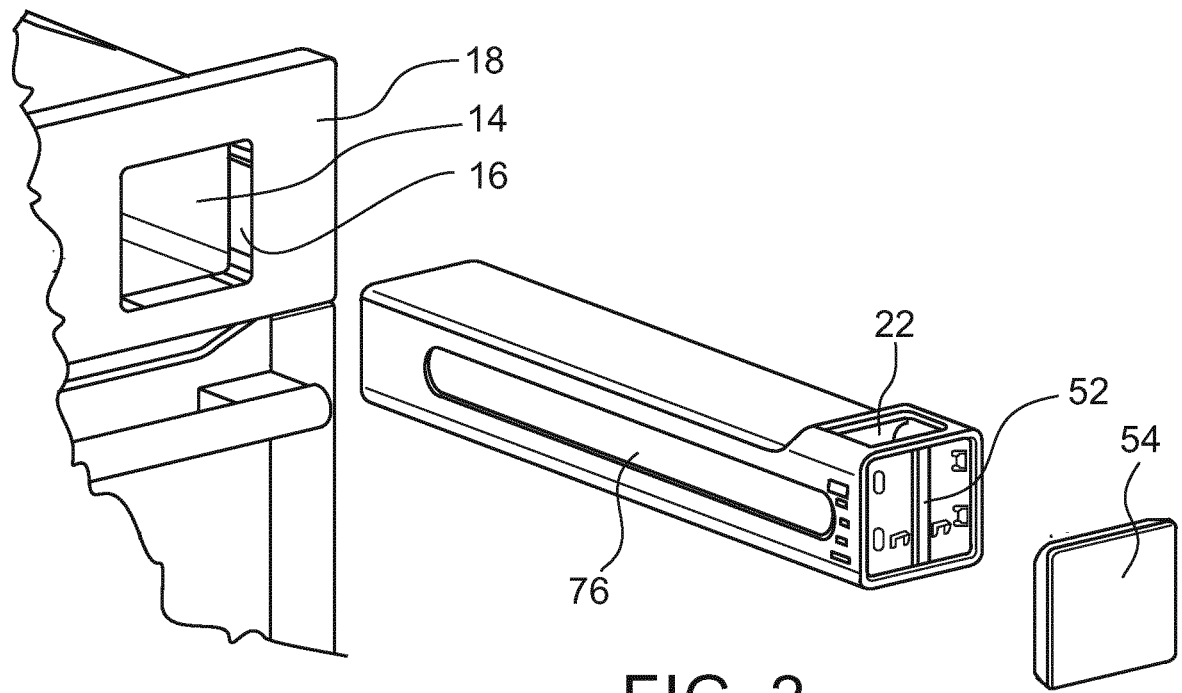
FIG. 2 is a view similar to FIG. 1 with the tank fully extracted.
Figure 3:
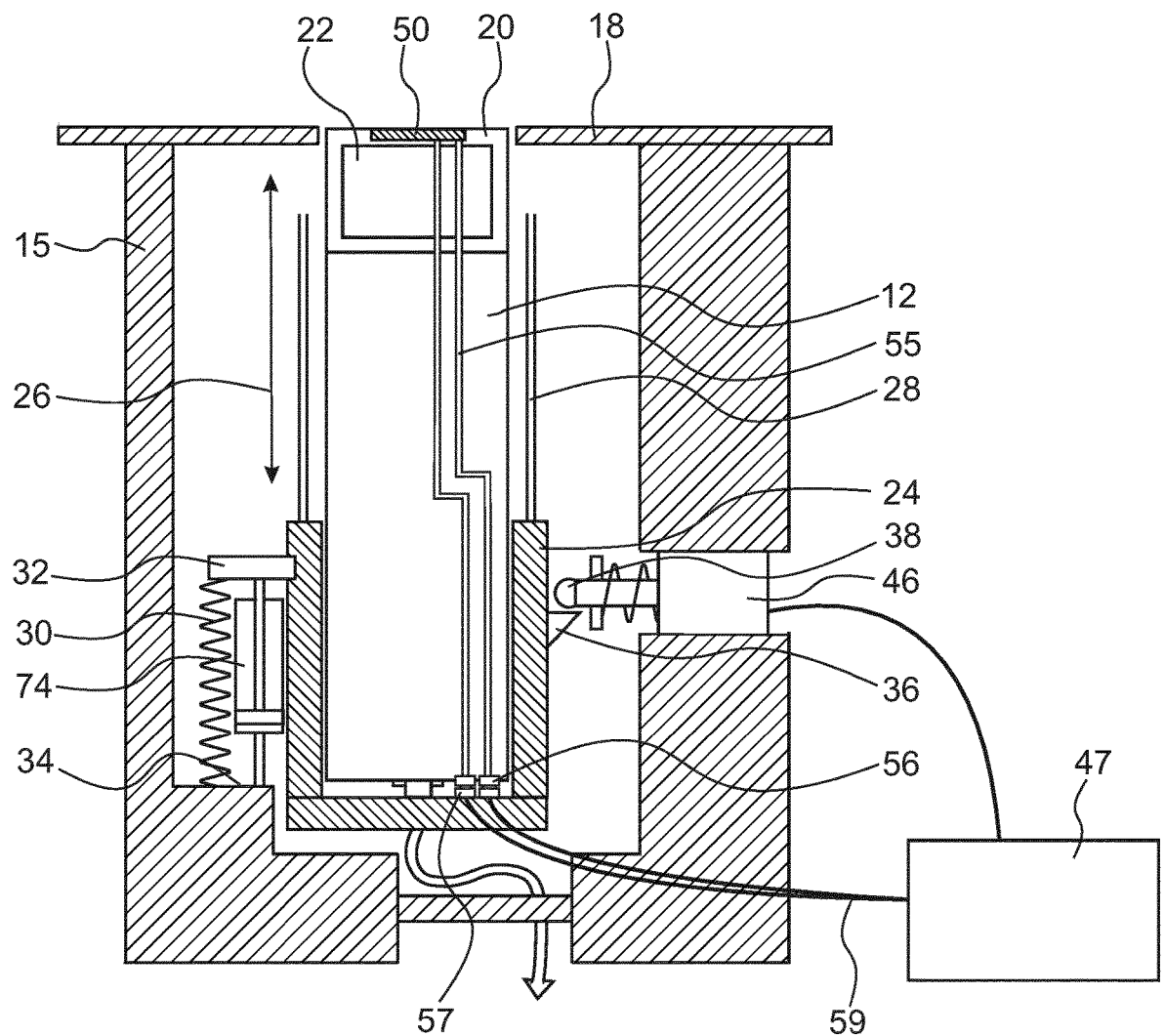
FIG. 3 is a sectional view of the household appliance shown in FIGS. 1 and 2 with the tank in the use position.
Figure 4:
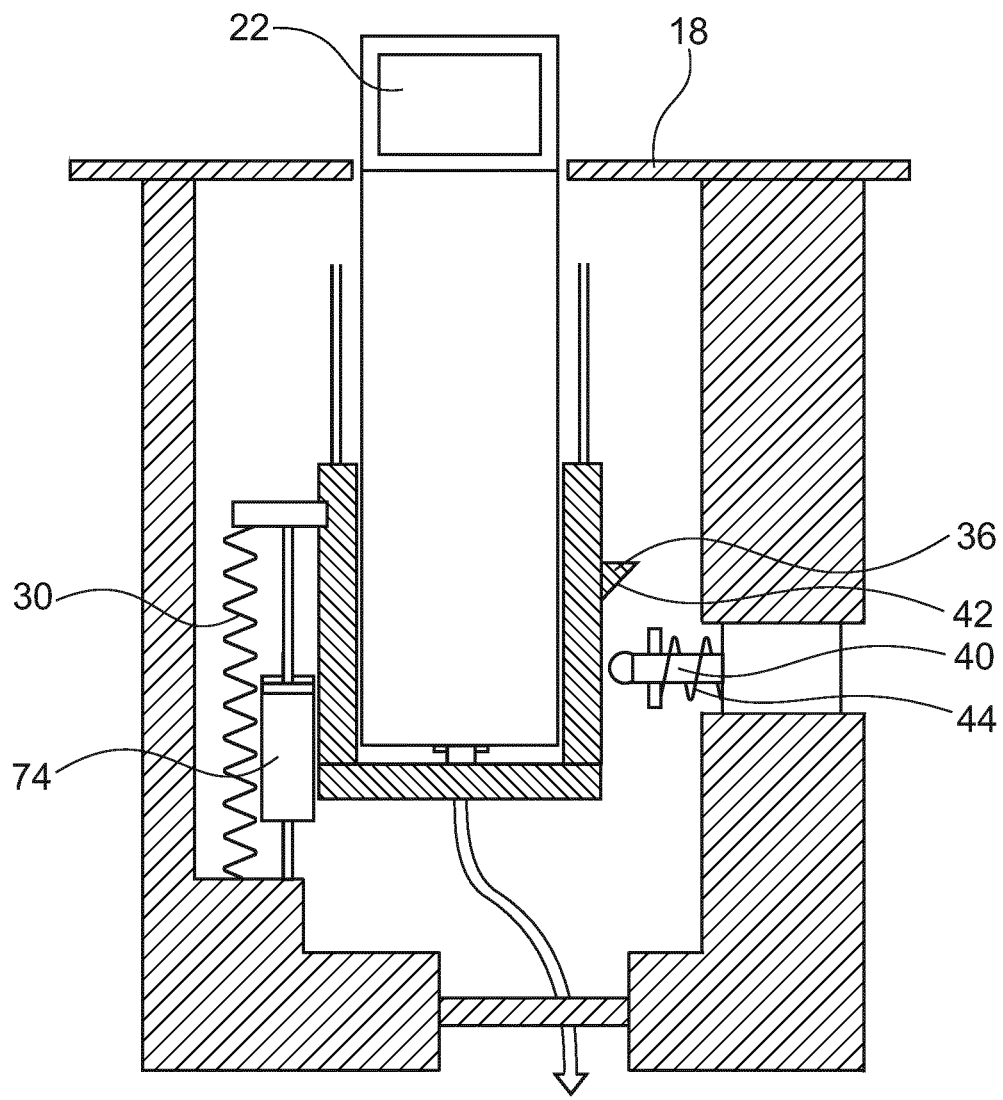
FIG. 4 is a sectional view similar to FIG. 3 with the tank in a servicing position for filling the tank.
Figure 5:
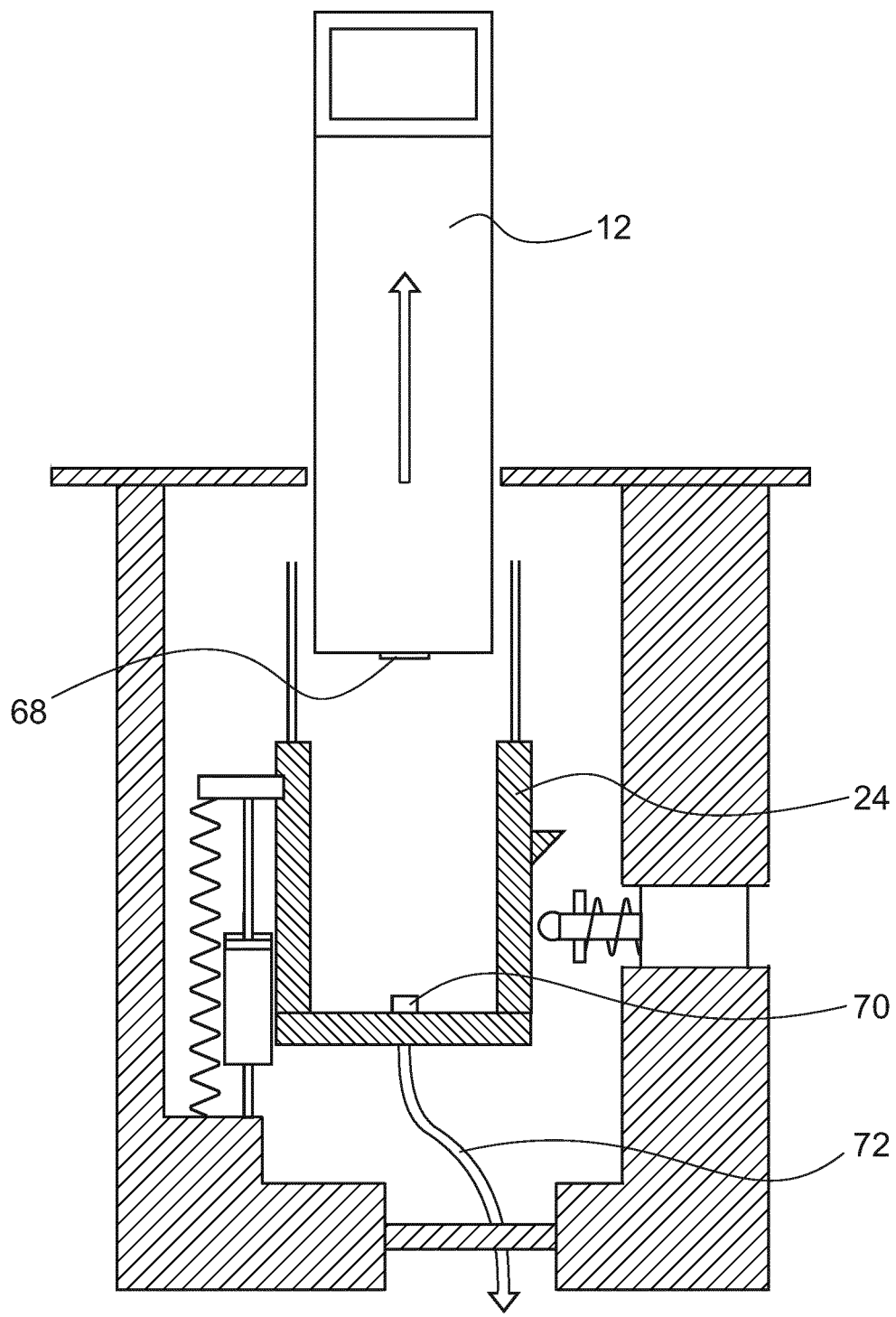
FIG. 5 is a sectional view similar to FIGS. 3 and 4 during full extraction of the tank.

FIGS. 3 to 5 depict horizontal sectional views of the tank section of the household appliance shown in FIGS. 1 and 2. In particular, FIG. 3 shows the tank 12 when in its use position, i.e. when fully inserted into a corresponding receptacle 14 provided within a housing 15 of oven 10. In the use position the front face of the tank which as shown in FIG. 1 may be formed by a cover element 20 is positioned flush with the front panel 18, so that the tank can be fully integrated into the front panel 18 so as to provide for a continuous and consistent design of the front panel. At its rearward portion, tank 12 is accommodated by a carriage 24. Carriage 24 is configured to be movable parallel to the longitudinal direction of tank 12 as shown in FIG. 3 by arrow 26. To this end, there are provided guide rails 28 which support carriage 24 for movement between a first end position corresponding to the use position of the tank shown in FIG. 3, and a second end position shown in FIG. 4 in which the carriage 24 has been displaced outwardly so as to eject the tank by a length such that the fill opening 22 is fully accessible to allow filling of the tank. Whereas in the somewhat schematic views of FIGS. 3 to 6 the carriage 24 is shown to extend so as to accommodate the rear portion of tank 12 it should be understood that in the preferred embodiments the carriage 24 is longer and thus, when in the position shown in FIG. 4, may extend to close to the rear side of front panel 18, which not only provides for a more stable support of the tank but which also facilitates inserting the tank into the carriage after the tank having been completely removed.

Carriage 24 is biased towards the second end position of FIG. 4 by means of a compression spring 30, which is positioned to extend between an attachment 32 at carriage 24 and a seat 34 of housing 15. In the use position of tank 12 in which spring 30 is in a compressed state, the carriage is held by means of a catch 36 provided at the carriage, which is engaged by a locking member 38, which in the embodiment depicted in FIGS. 3 to 5 is biased towards the locking position by means of a spring biased piston 40. In particular, as illustrated in FIGS. 3 to 5, catch 36 comprises a ramp surface 42, which when pushing the tank 12 and hence the carriage 24 inwardly so as to move the tank into its use position, displaces the locking member 38 against the biasing force of a biasing spring 44. When catch 36 passes the locking member 38 upon the tank reaching its use position, the locking member 38 is released and thus snaps back into the locking position shown in FIG. 3.

When tank 12 is to be ejected from receptacle 14, such as to fill or empty the tank, the engagement between catch 36 and locking member 38 is released by activating a release means, which in preferred embodiments is an electrically driven actuator. In the embodiment shown in FIGS. 3 to 5 the release means comprises a solenoid actuator 46 which is configured to retract piston 40 and hence locking member 38 against the biasing force of biasing spring 44, so that the carriage 24 is pushed outwards by the force of compression 30 and thus the tank 12 is ejected into the servicing position illustrated in FIG. 4. Solenoid actuator 46 may be activated by applying an electrical signal, either user activated such as by pushing a respective switch, or automatically under the control of a controller 47 of the household appliance in the course of executing a control program. The switch for activating actuator 46 may be a switch 48 provided at the front panel 18 (see FIG. 1), a switch 50 that is provided in the cover element 20 of tank 12 (see FIG. 3), or may be a switch 52 which is provided at the front face of tank 12 and which can be activated by depressing a button element 54 which in the embodiment illustrated in FIG. 2 replaces cover element 20. In such latter embodiment the tank preferably comprises a wire harness 55 that is embedded in a wall of the tank 12 and which connects the switch 52 with contacts 56 provided at the rear wall of the tank. As illustrated in FIG. 3, in the use position of the tank, contacts 56 electrically engage contacts 57 provided at the rear wall of the carriage 24, which are connected by wires 59 to controller 47.

Whereas in such embodiment the contacts 56 and 57 serve for connecting activation switch 50 to controller 47, contacts 56 and 57 also can be used as means for detecting whether the tank 12 is properly inserted into carriage 24. That is, contacts 56 and 57 also may be provided in embodiments in which an activation switch is located not at the tank but at the front panel, such as switch 48 shown in FIG. 1, in which case the contacts 56 that are provided at the tank can be connected to each other and a determination can be made whether the tank is properly inserted by checking whether a signal applied to one of contacts 56 and 57 also is present at the respective other one of the two contacts.

Figure 6:
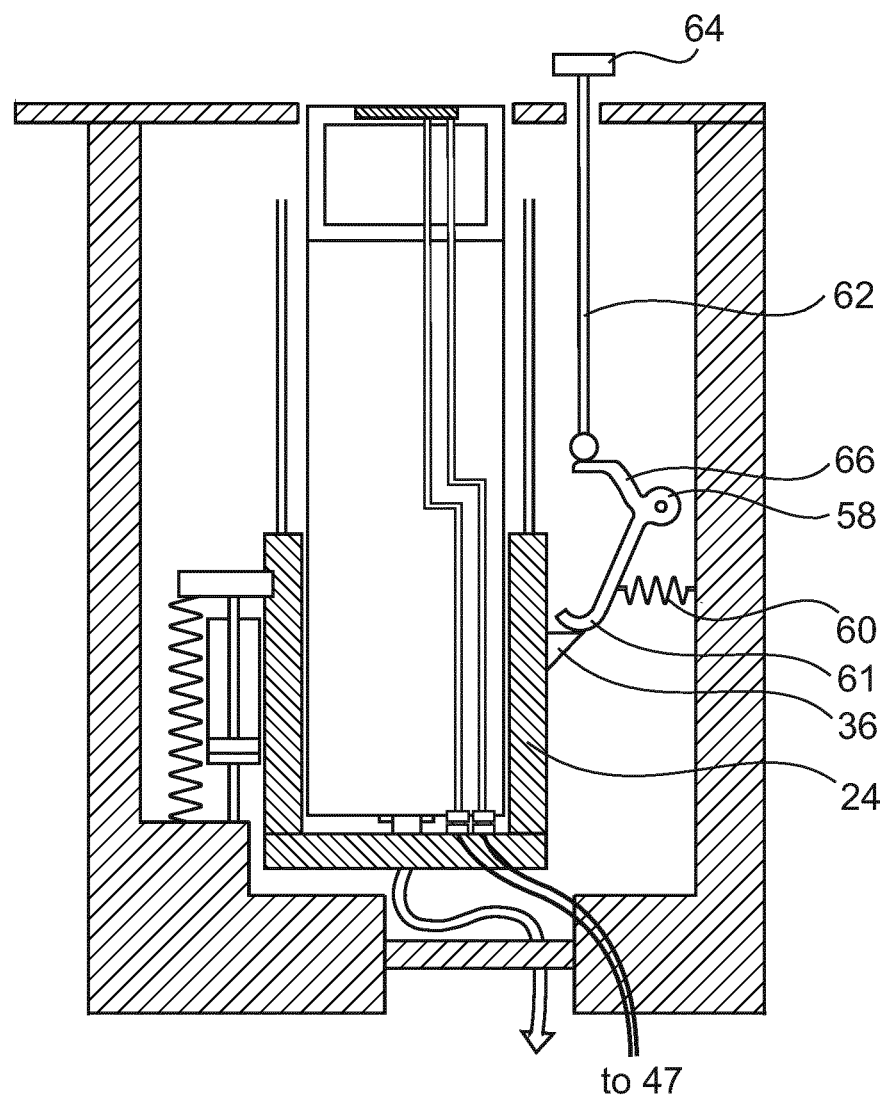
FIG. 6 is a sectional view similar to FIG. 3 which illustrates an alternative embodiment.

Instead of a release means that can be activated electrically, there also can be provided a manually releasable locking member. For example, as is illustrated in FIG. 6, there can be provided a rotatable latch 58 having a first leg 61, which is biased into engagement with the catch 36 by a biasing spring 60 and which can be released from its engagement with the catch 36 by means of a push rod 62. To this end push rod 62 is arranged to extend between a push button 64 and a second leg 66 of the rotatable latch 58. By pressing push button 64 which in the locking position of the first leg 61 projects from front panel 18 (see also FIG. 1), the rotatable latch 58 is rotated against the biasing force of spring 60, so as to release catch 36 and hence eject carriage 24 with tank 12.

In order to establish a connection to a fluid line when the tank is inserted into the carriage, there is provided for a fluid coupling which comprises a first member 68 provided at the rear end of the tank 12 which cooperates with a second fluid coupling member 70 which in the embodiment illustrated in FIGS. 3 to 6 is provided at the carriage 24. Whereas is such embodiments the second fluid coupling member 70 is connected preferably via a flexible hose 72 to a fluid line of the household appliance, the second fluid coupling member also could be fixedly provided at the housing 15 to engage the first fluid coupling member 68 via an aperture provided in the carriage, wherein a fluid coupling thus is established when the tank is moved into the use position, rather than when inserting the tank into the carriage. In any event, the fluid coupling preferably is configured to seal the respective coupling members, and in particular the first fluid coupling member 68 so as to prevent liquid from leaving the tank 12 when the tank is removed from the carriage 24.

As illustrated in FIGS. 3 to 6, the household appliance preferably is equipped with a damper 74 for slowing the movement of the carriage 24 before the tank 12 reaches the servicing position. Damper 74 which provides for a smooth stop of tank 12 when it reaches its servicing position may comprise for example a hydraulic damper, a linear friction damper, a rotary damper or the like.

While in FIGS. 3 to 6, the damper 74 is shown to be connected to the carriage 24 via attachment 32 and hence provides for dampening over the entire range of movement of the carriage 24, the damper 74 also can be designed to come into action only towards the end of travel of carriage 24.

Referring again to FIG. 2, tank 12 preferably is provided with a handle, such as a recessed grip 76, which facilitates manipulating the tank during removal of the tank from the household appliance, and when inserting the tank back into the receptacle 14 and further into the carriage 24.

The household appliance described above and claimed herein provides for an easy to use removable tank system for a household appliance, wherein a removable tank can be ejected from the household appliance simply by pressing an activation button. While releasing the tank form its use position causes a displacement of the tank into a servicing position in which the tank is ejected so as to expose a fill opening, the tank can be easily removed from the household appliance simply by manually gripping the tank and pulling the tank further in the direction of ejection of the tank. After having filled or emptied the tank, the tank can be easily pushed back into the household appliance, so that the tank first is brought into engagement with the carriage, and by pushing further in the same direction, is fully inserted into its use position against the biasing force of a spring, which when again activating the release means provides for ejection of the tank.

The system suggested herein can be easily implemented and hence provides for a cost effective and reliable solution that is easy to use.

REFERENCE SIGNS 10 oven
12 water tank
14 receptacle
15 housing
16 aperture
18 front panel
20 cover element
22 fill opening
24 carriage
26 direction of movement
28 guide rails
30 compression spring
32 attachment of 30 at 24
34 seat
36 catch
38 locking member
40 piston
42 ramp surface
44 biasing spring
46 solenoid actuator
47 controller
48 switch
50 switch
52 switch
54 button element
55 wire harness
56, 57 contacts
58 rotatable latch
59 wires
60 biasing spring
61 first leg of 58
62 push rod
64 push button
66 leg
68 first fluid coupling member
70 second fluid coupling member
72 flexible hose
74 damper

The invention claimed is:

1. A household appliance comprising a liquid tank adapted for longitudinal translational movement along a longitudinal axis between a use position in which the tank is positioned within a housing of the household appliance and a servicing position in which the tank is at least partially extracted from the housing, the household appliance further comprising biasing means for biasing the tank towards the servicing position, and releasable latch means for selectively arresting the tank in the use position or releasing the tank for movement towards the servicing position,
    the household appliance further comprising a carriage associated to the tank and configured for longitudinal translational movement along said longitudinal axis via a guide provided in the housing while engaged with said tank;
        wherein the tank is removably engageable to the carriage via said longitudinal translational movement of the tank relative to the carriage;
    the biasing means comprising a spring element configured to be loaded when the tank is moved from the servicing position towards the use position; and
    the latch means comprising:
        a catch provided at the carriage,
        a locking member located at the housing which in the use position of the tank engages the catch to arrest the tank in the use position, and
        an electric drive for retracting the locking member out of engagement with the catch.

2. The household appliance of claim 1, wherein the locking member is biased towards engagement with the catch.

3. The household appliance of claim 2, wherein the catch comprises a ramp surface configured to displace the locking member when the tank is moved towards the use position and to release the locking member to engage the catch upon the tank reaching the use position.

4. The household appliance of claim 1, further comprising an actuation element for activating the electric drive, the actuation element positioned at a front panel of the household appliance or at a front panel of the liquid tank.

5. The household appliance according to claim 1, wherein the tank comprises a fill opening in an upper side of the tank at a front end of the tank.

6. The household appliance of claim 5, wherein in the servicing position the tank is extracted to an extent such that the fill opening is exposed.

7. The household appliance of claim 1, wherein the carriage comprises a slide for accommodating the tank, the slide being oriented generally parallel to the guide.

8. The household appliance of claim 7, comprising a fluid coupling that provides for connection of the tank to a fluid line of the household appliance.

9. The household appliance of claim 8, wherein the fluid coupling comprises a first member that is provided at the tank and a second member that is provided at the carriage and is connected to the fluid line by a flexible hose.

10. The household appliance of claim 8, wherein the fluid coupling comprises a first member that is provided at the tank and a second member that is provided at the housing.

11. The household appliance according to claim 1, further comprising a damper for slowing movement of the carriage before the tank reaches the servicing position.

12. The household appliance according to claim 1, wherein the household appliance is a steam oven.

13. A household appliance comprising a receptacle accessible through an opening in an outer panel of the appliance; a liquid-storage tank insertable through said opening to be accommodated within said receptacle; said liquid-storage tank being fully insertable through said opening so that a front portion thereof is flush or continuous with said outer panel in a use position of the storage tank, and being partially extendable from but still retained in said receptacle in a servicing position of the storage tank; a fill opening disposed at a front end of said storage tank and being thereby accessible from outside said appliance when the storage tank is in said servicing position; a fluid coupling adapted reversibly to establish fluid communication between said storage tank and a fluid line of said appliance when the storage tank is in said use position, and to seal said storage tank to prevent leakage of liquid through said coupling when said storage tank is not in said use position; a carriage adapted to translationally accommodate said storage tank when the storage tank is received within said receptacle and translated along a longitudinal axis toward and into cooperation with said carriage, said carriage being longitudinally translatable along the longitudinal axis between a first end position corresponding to the use position of said storage tank and a second end position corresponding to the servicing position of said storage tank, said carriage being spring-biased toward said second end position and being longitudinally translatable therefrom against said spring bias into said first end position upon engagement with and longitudinal displacement along said longitudinal axis by said storage tank upon insertion thereof up to said use position; a locking member that cooperates in a locking position thereof with a catch on said carriage in order to retain said carriage in said first end position against said spring bias, said locking member being biased into said locking position and being displaceable out of said locking position against its bias by an electric drive adapted to retract the locking member out of engagement with the catch; and a damper adapted to slow movement of said storage tank toward said servicing position against the urging of said carriage based on the spring bias acting on said carriage.

14. The household appliance according to claim 13, said electric drive comprising a solenoid actuator that is operated via a user-operable switch.

15. The household appliance according to claim 13, said storage tank further comprising a first electrical contact at a rear thereof adapted to abut and communicate electrically with a second electrical contact disposed in the household appliance when the storage tank is properly inserted and seated in said use position, wherein an electrical signal transmitted via said first and second electrical contacts: provides in indication that the storage tank is properly seated in said use position, provides electrical communication between said actuator or a controller thereof and a user-operable switch at said front portion of said storage tank in order that said actuator will displace said locking member to release said storage tank from said use position upon user-operation of said switch, or both.

16. The household appliance according to claim 1, wherein a damper is connected to the carriage via an attachment.

17. The household appliance according to claim 13, wherein the damper is connected to the carriage via an attachment.

* * * * *